(12) United States Patent
Reitz et al.

(10) Patent No.: US 7,166,059 B2
(45) Date of Patent: Jan. 23, 2007

(54) METHOD FOR UPSHIFTING OF A PARALLEL SHAFT GEAR

(75) Inventors: Dierk Reitz, Baden-Baden (DE); Thomas Pels, Heiden (DE); Bard Vestgard, Lier (NO)

(73) Assignee: LuK Lamellen und Kupplungsbau Beteilingungs KG, Buehl (DE)

( * ) Notice: Subject to any disclaimer, the term of this patent is extended or adjusted under 35 U.S.C. 154(b) by 166 days.

(21) Appl. No.: 10/905,571

(22) Filed: Jan. 11, 2005

(65) Prior Publication Data

US 2005/0164829 A1    Jul. 28, 2005

(30) Foreign Application Priority Data

Jan. 27, 2004    (DE) .................. 10 2004 003 892

(51) Int. Cl.
*B60W 10/02* (2006.01)
*F16H 3/38* (2006.01)
*F16H 37/06* (2006.01)

(52) U.S. Cl. .................. 477/5; 74/329; 74/340; 74/664

(58) Field of Classification Search .................. 74/331, 74/335, 339, 340, 661, 664; 477/5, 6
See application file for complete search history.

(56) References Cited

U.S. PATENT DOCUMENTS 6,634,247 B1 * 10/2003 Pels et al. .................. 74/329
2002/0189397 A1 * 12/2002 Sakamoto et al. .......... 74/661

FOREIGN PATENT DOCUMENTS

| DE | 19945473 | 4/2000 |
| DE | 19950679 | 4/2001 |
| DE | 10133695 | 3/2002 |
| EP | 1270301  | 1/2003 |

* cited by examiner

*Primary Examiner*—Charles A Marmor
*Assistant Examiner*—Derek D. Knight
(74) *Attorney, Agent, or Firm*—Simpson & Simpson, PLLC

(57) ABSTRACT

In a method for upshifting a parallel shift transmission having two input shafts, each of which is coupleable via a clutch to the drive shaft of a driving engine, an output shaft, which may be brought into rotationally fixed engagement with the input shafts via different transmission gear sets, and at least one electric machine that is rotationally fixedly connectable to an input shaft for output of a boost torque, which boosts the drive torque of the driving engine, the boost torque produced by the electric machine during the phase in which the speed of the driving engine drops when shifting from an old gear into a new, higher gear is at least approximately replaced by the torque produced by the driving engine as a result of the drop in speed.

7 Claims, 2 Drawing Sheets

US 7,166,059 B2

METHOD FOR UPSHIFTING OF A PARALLEL SHAFT GEAR

CROSS-REFERENCE TO RELATED APPLICATION

This patent claims priority of German Patent Application No. 10 2004 003 892.9, filed Jan. 27, 2004, which application is incorporated herein by reference.

BACKGROUND OF THE INVENTION

This invention relates to a method for upshifting a parallel shift transmission comprising two input shafts, each of which is coupleable to a drive shaft of a driving engine via a clutch, an output shaft, which may be brought into rotationally fixed engagement with the input shafts via different transmission gear sets, and at least one electrical machine that is rotationally fixedly connectable to the input shafts for output of a boost torque that assists the drive torque of the driving engine.

BRIEF SUMMARY OF THE INVENTION

FIG. 3 shows a schematic illustration of a parallel shift transmission, together with an accompanying control device, as is used in modern motor vehicles.

A drive shaft 12, for example, the crankshaft of a driving engine 14, such as an internal combustion engine, is in rotationally fixed engagement with the input end of a first clutch K1 and a second clutch K2 via a drive gear 16. The output end of clutch K1 is rotationally fixedly connected to a first input shaft 18. The output end of second clutch K2 is rotationally fixedly connected to a second input shaft 20. Transmission gears 1, 3, 5 and R are mounted on input shaft 18; transmission gears 4, 6 are mounted on input shaft 20. Furthermore, a transmission gear 2 is rotationally fixedly connected to input shaft 20. Transmission gears 1, 3, 6 and 4 mesh with gear wheels that are rotationally fixedly joined to an output shaft 22. Transmission gears 5 and 2 mesh with gear wheels rotatably mounted on output shaft 22, and transmission gear R via intermediate gear 25 is in rotational engagement with a gear wheel that is rotationally fixedly joined to output shaft 22. Using coupling members 24, 26, 28 and 30, particular transmission gears or gear wheels are coupleable with the accompanying shafts in a synchronizable and rotationally fixed manner so that different gears are shiftable between drive shaft 12 and output shaft 22, depending on which particular clutch K1 or K2 is engaged. The numbers assigned to the individual gears, or the letter R, designate the particular gear that is selected when there is a rotationally fixed coupling of the particular input shaft to the output shaft and engaged accompanying clutch. For example, the first gear is shifted when clutch K1 is engaged and the transmission gear 1 is rotationally fixedly coupled with input shaft 18 by means of coupling member 24. Of course, clutch K2 is then disengaged.

The rotor of an electric machine 32, which may be operated as a starter/generator, for example, is joined to input shaft 20 in a rotationally fixed manner or via an additional clutch (not shown).

An electronic control device 34, whose inputs are connected to sensors 36 for detection of operating states of driving engine 14, sensors 38 for the detection of operating states of the parallel shift transmission, a sensor 40 for the detection of the position of a selector lever 42 and a sensor 44 for the detection of the position of an accelerator pedal 46, is used to control the described transmission.

Outputs of electronic control device 34, which contains a microprocessor along with associated program and data memories, are connected to an actuator 46 for operating a master actuator of driving engine 14, actuators 48 for operating clutches K1 and K2, actuator 50 for operating coupling members 24, 26, 28 and 30 and a control unit 52 for controlling the energy flow between electric machine 32 and an electric energy accumulator 54.

Structure and function of the described system are known in and of themselves and therefore are not explained in detail.

To start the driving engine 14, which is designed as an internal combustion engine, clutch K1 is disengaged, clutch K2 is engaged, and there is no rotationally fixed connection between input shaft 20 and output shaft 22; so driving engine 14 may be started using electric machine 32. As soon as driving engine 14 is running, first gear is selected using coupling member 24 so that driving can begin by engagement of clutch K1. First gear may, for reasons of dynamics, also be engaged even before the start of drive engine 14. Before or during the start of drive engine 14, clutch K1 may optionally already be engaged to the extent that a crawling or starting torque is transmitted to the transmission. The torque output from electric machine 32 is then set to zero so that second gear may be selected using coupling member 30 and so that it is possible to shift from first to second gear by disengaging clutch K1 and simultaneously engaging clutch K2. If the vehicle is to be decelerated, the kinetic energy of the vehicle may be transferred from output shaft 22 via suitable paths to input shaft 20 and thus to electric machine 32, which then runs as a generator and charges energy accumulator 54.

Electric machine 32 may be used not just to start driving engine 14 and as a generator for the recovery of braking energy but also to boost the torque produced by driving engine 14. When clutch K2 is engaged (gear 2, 4 or 6 selected), the additional driving torque of the electric machine is fed directly into input shaft 20, which transmits the torque (the torque transmission path is drawn as a thick unbroken line).

If gears 1, 3 or 5 are selected, i.e., the driving torque of driving engine 14 is transmitted via input shaft 18 to output shaft 22 (broken line path), one of gears 2, 4 or 6 may be selected when clutch K2 is disengaged and the boost torque of electric machine 32 may be transmitted via the selected gear to output shaft 22.

In a parallel shift transmission before the actual gear shift or gear change, which is accomplished via overlapping counterdirectional actuation of clutches K1 and K2, a gear is pre-selected or engaged or shifted into neutral, according to a pre-determined strategy, on the particular input shaft that is assigned to the disengaged clutch. The synchronization with the new gear in this context occurs without the driver noticing it. Electric machine 32, which in the illustrated example is rotationally fixedly joined to input shaft 20, must, in the illustrated example for the synchronization or selection of an even gear when clutch K2 is disengaged, be driven by control unit 32 in such a manner that it outputs no torque or after the disengagement of the engaged gear aids a synchronization to the new pre-selected gear. This synchronization may also be taken over completely by the electric machine so that on this transmission input shaft the synchronization devices may be eliminated. In full-load-boost mode, i.e., when there is full acceleration of the vehicle with boosting of the drive torque of driving engine 14 by electric machine 32, through whose boost torque this leads to a drop in acceleration of the vehicle during a gear change that is uncomfortable for the occupants.

The object of the invention is to create a possibility of preventing a drop in acceleration when upshifting a parallel shift transmission under boost mode operation.

This objective is achieved using a method for upshifting a parallel shift transmission having two input shafts, each of which is coupleable via a clutch to the drive shaft of a driving engine, an output shaft, which may be brought into rotationally fixed engagement with the input shafts via different transmission gear sets, and at least one electric machine that is rotationally fixedly joined to an input shaft for output of a boost torque, which boosts the driving torque of the driving engine, in which method the boost torque produced by the electric machine during the phase in which the speed of the driving engine drops when shifting from an old gear into a new, higher gear is at least approximately replaced by the torque produced by the driving engine as a result of the drop in speed.

An advantageous embodiment of the method of the invention includes the following steps:
a) Lowering the torque transmitted by the clutch assigned to the old gear from a starting value to approximately zero;
b) Essentially simultaneous increase of the torque transmitted by the clutch assigned to the new, next-higher gear from zero to approximately the starting value;
c) Maintenance of the boost torque output by the electric machine before the beginning of step a) during steps a) and b);
d) Increase of the torque transmitted by the clutch assigned to the new, next higher gear beyond the starting value;
e) Essentially simultaneous lowering of the boost torque to approximately zero;
f) Lowering of the torque transmitted by the clutch assigned to the new, next higher gear to approximately the starting value; and,
g) Essentially simultaneous increase of the boost torque to approximately its starting value.

Advantageously, between steps e) and f) the gear that is two gears higher is shifted between the input shaft assigned to the old gear and the output shaft.

Moreover, after conclusion of steps f) and g) it is advantageous if the speed of the driving engine is lowered from the speed corresponding to the old gear to the speed corresponding to the next higher gear.

In an advantageous embodiment of the method, the clutch is operated in step d) in a slipping mode. It is advantageous if the clutch in step d) and the electric machine in step e) are operated in such a manner that the sum of the driving torque produced as a result of lowering the speed of the driving engine and the boost torque of the electric machine at that time is roughly constant.

BRIEF DESCRIPTION OF THE SEVERAL VIEWS OF THE DRAWING

The invention is explained below by way of example using schematic drawings, in which are shown.

DETAILED DESCRIPTION OF THE INVENTION

Figure 3:
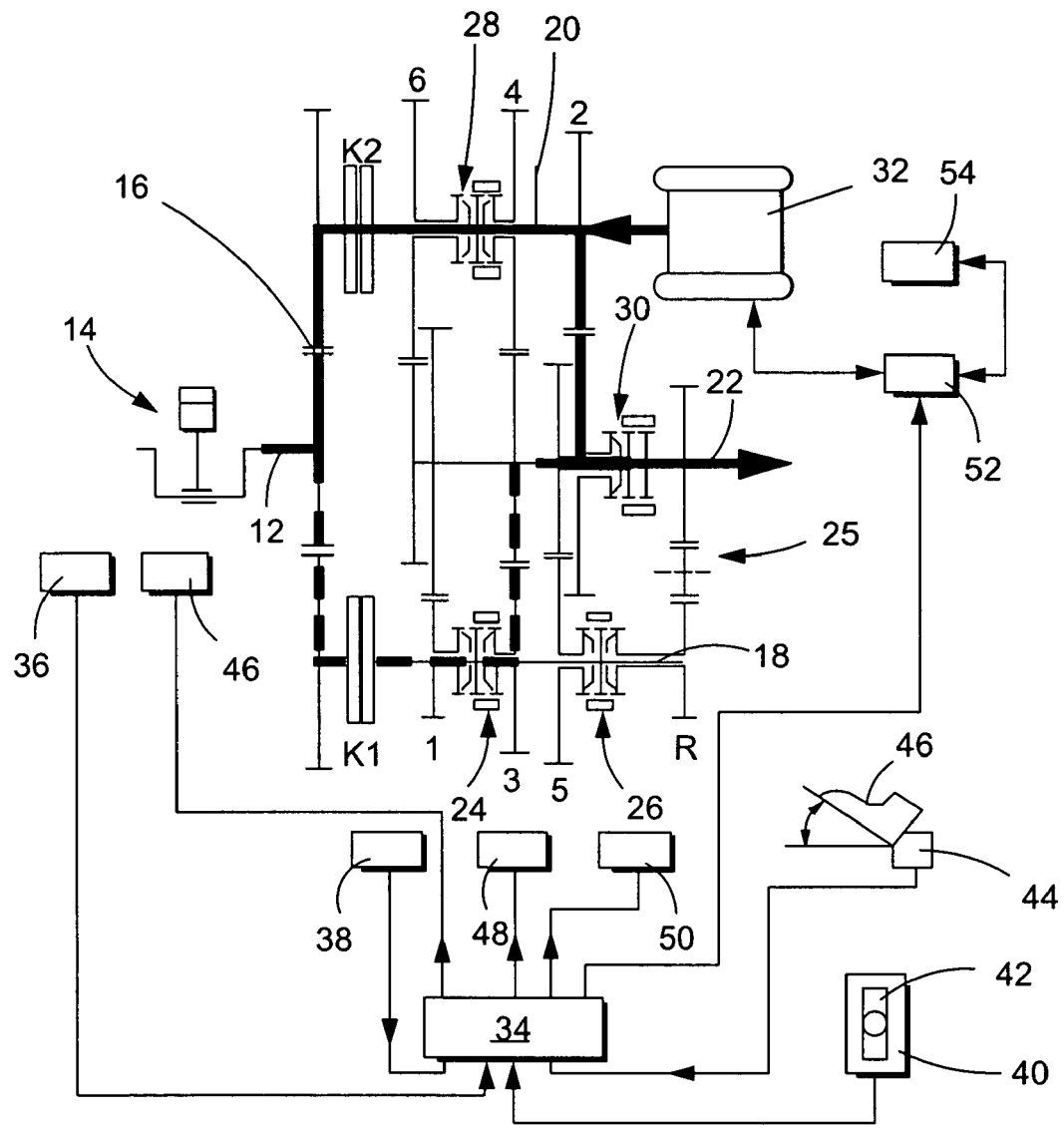
FIG. 3 shows the previously described, known structure of a parallel shift transmission along with electric machine and control device.

The invention is explained below with reference to a pulling upshift from second to third gear with simultaneous boost torque while using the system according to FIG. 3.

Figure 1:
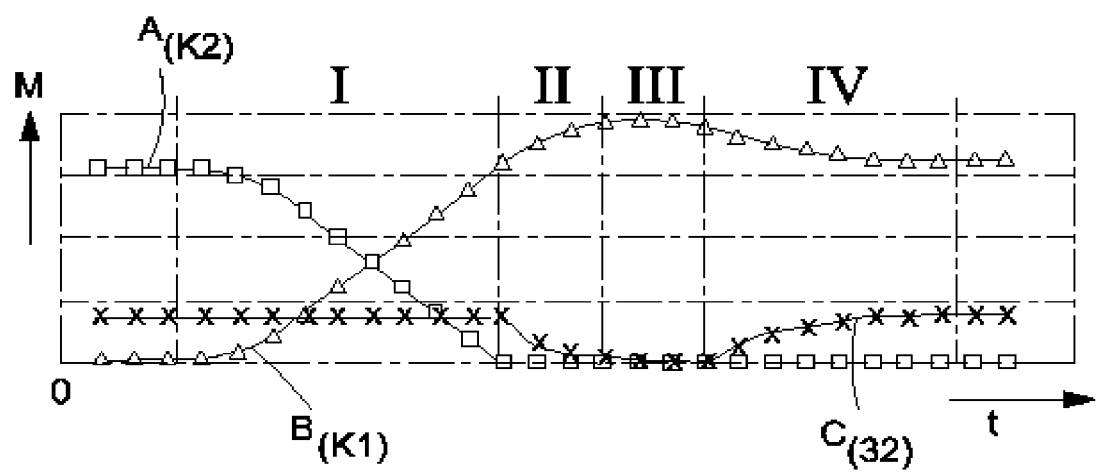
FIG. 1 shows a flow chart of an upshift with the time characteristic of various torques.
Figure 2:
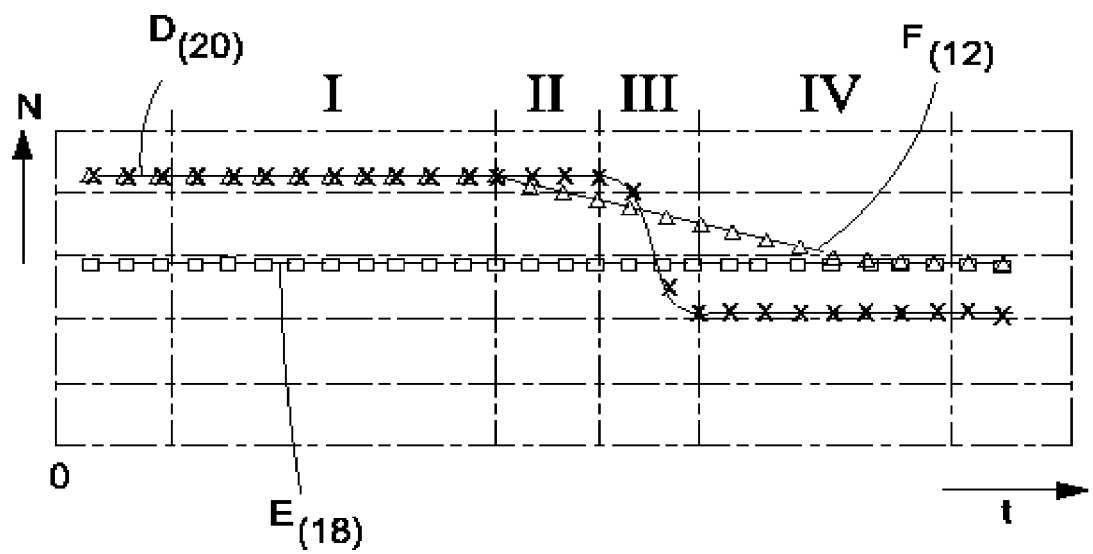
FIG. 2 shows the characteristic of different speeds during the time.

In FIGS. 1 and 2, each of the abscissas indicates the time curve, the depicted time window being, for example, less than a half second. The torque is indicated on the ordinate of FIG. 1, the depicted area ranging from 0 to 200 Nm. In FIG. 2, the ordinate indicates speeds, the depicted area ranging, for example, from 0 to 5000 min–'. Different phases of a shift are depicted using I, II, III and IV, in which different procedural steps occur.

It is first assumed the vehicle is accelerated in third gear with driving engine 14 running under full load and additional boost torque of electric machine 32. Clutch K2 (FIG. 3) is then engaged and according to curve A, which is represented by rectangles (FIG. 1) on the left-hand side of phase I, transmits a torque corresponding to a starting value that is large enough that clutch K2 is operated at least essentially slip-free. According to Curve B, which is represented with triangles, clutch K1 transmits a torque of approximately 0, i.e., is disengaged. Electric machine 32 is operated according to curve C with a boost torque, which, in addition to the driving torque of driving engine 14, drives and accelerates the vehicle. In Phase I, in which a shift operation begins, by lowering the torque of clutch K2 to approximately zero and essentially simultaneously increasing the torque transmitted by clutch K1 (Curve B) to approximately the starting value, a changeover of the torque transmission from drive shaft 20 to input shaft 18 and from there to output shaft 22 via the third-gear gear edge, which is rotationally fixedly coupled to input shaft 18. The boost torque of the electric machine is kept essentially unchanged in Phase I (Curve C).

In a next phase II, the torque that is transmissible by clutch K1 is increased above the starting value according to curve B, clutch K1 advantageously still being in the slipping phase. Due to this excess, clutch K1 is capable of transmitting an additional driving torque produced by driving engine 14 as a result of its deceleration to the speed corresponding to the new gear, so that the boost torque of electric machine 32 in phase II may be reduced to nearly zero without a drop in acceleration occurring.

During the next phase III, in which driving motor 14 is further decelerated as a result of shifting into third gear and as consequently compensates for the lacking boost torque, the electric machine introduces no torque or assists the synchronization of the next pre-selection gear or executes this when there a synchronization device is lacking so that the transmission gear of the fourth gear may be engaged via coupling member 28, drive shaft 20 being decelerated to a lower speed corresponding to fourth gear.

After termination of phase III, the torque transmissible by clutch K1 is decreased in phase IV to approximately the starting value, which corresponds to the torque generated by driving engine 14 at constant speed under full load, and electric machine 32 is in turn controlled in such a manner that it produces the boost torque, so that after the end of phase IV the vehicle in third gear, with fourth gear now selected or pre-selected, accelerates further under additional boost torque of electric machine 54 with clutch K1 being slip-free at least to a large extent.

FIG. 2 shows how the speed of driving engine 14 continuously decreases according to curve F from the end of phase I to approximately the center of phase IV in accordance with the shift from second into third gear, the speed of "old" input shaft 20 decreases according to curve D in phase III due to the synchronization or selection of fourth gear by means of coupling member 28 from a ratio corresponding to second gear to a ratio corresponding to fourth gear, and the speed of input shaft 18 (and also output shaft 22) is essentially constant.

Altogether, using the described method a full-load pulling upshift with boost support is achieved in which no drop in acceleration occurs and at the end of which the next higher gear is already pre-selected for a rapid further shifting.

The described method in the depicted example is valid for pulling upshifts to odd-numbered gears. For pulling upshifts to even-numbered gears, the previously described method is only necessary then if both input shafts 20 and 18 are each coupled with one electric machine each.

Of course, the described method is also applicable to parallel shift transmissions that differ in their detailed structure from the previously described parallel shift transmission to the extent that the structure of the parallel shift transmission and the connection of the electric machine or the electric machines makes it possible to replace the boost torque during the phase in which the speed of the driving engine drops during the crossover shift from an old gear into a new higher gear via simultaneous counterdirectional actuation of the clutches with the torque produced by the driving engine as a result of the drop in speed and thereby prevent a drop in acceleration. By virtue of the fact that the boost torque of the electric machine may be driven down to at least approximately zero, a synchronization of a new gear or selection thereof is possible.

The patent claims submitted with the application are proposed formulations without prejudice to the achievement of further patent protection. The applicant reserves the right to submit claims for further combinations of features previously only disclosed in the description and/or the drawings.

References used in dependent claims refer to the further development of the subject matter of the principle claim via the features of the particular dependent claim; they are not to be understood as a renunciation of achieving independent protection for the combination of features for the dependent claims that are referenced.

Since the subject matter of the dependent claims may constitute separate and independent inventions in relation to the state of the art on the priority date, the applicant reserves the right to make them the subject matter of independent claims or division declarations. Furthermore, they may also contain independent inventions that have a design that is independent of the subject matter of the preceding dependant claims.

The embodiments are not to be understood as a restriction of the invention. Rather, numerous amendments and modifications are possible within the context of the current disclosure, especially those variants, elements and combinations and/or materials that one skilled in the art may learn, for example, by combining individual ones together with those in the general description and embodiments in addition to features and/or elements or methodological steps described in the claims and contained in the drawings with the aim of achieving the objective and leading to a new subject matter or new methodological steps or sequences of steps via combinable features, even as far as production, testing and work procedures are concerned.

PARTS LIST

1 Transmission gear
2 Transmission gear
3 Transmission gear
4 Transmission gear
5 Transmission gear
6 Transmission gear
R Transmission gear
12 Drive shaft
14 Driving engine
16 Drive gear
18 Input shaft
20 Input shaft
22 Output shaft
24 Coupling member
26 Coupling member
28 Coupling member
30 Coupling member
32 Electric machine
34 Electronic control device
36 Sensors
38 Sensors
40 Sensor
42 Selector lever
44 Sensor
46 Actuator
48 Actuators
50 Actuators
52 Control unit
54 Energy accumulator

What is claimed is:

1. A method for upshifting a parallel shift transmission having two input shafts (18, 20), each of which is coupleable via a clutch (K1, K2) to a drive shaft (12) of a driving engine, and an output shaft (22), which may be brought into rotationally fixed engagement with the input shafts via different transmission gear sets, and at least one electric machine (32) that is rotationally fixedly joined to an input shaft for output of a boost torque, which boosts the driving torque of the driving engine, in which method the boost torque produced by the at least one electric machine (32) during a phase in which the speed of the driving engine (14) drops when shifting from an old gear into a new, higher gear is at least approximately replaced by torque produced by the driving engine as a result of the drop in speed, said method comprising the following steps:
   a) lowering the torque transmitted by the clutch assigned to the old gear from a starting value to approximately zero;
   b) essentially simultaneously increasing of the torque transmitted by the clutch assigned to the new, next-higher gear from zero to approximately the starting value;
   c) maintaining the boost torque that is output by the electric machine before the beginning of step a) during steps a) and b);
   d) increasing of the torque transmitted by the clutch assigned to the new, next higher gear beyond the starting value;
   e) essentially simultaneously lowering the boost torque to approximately zero;
   f) lowering of the torque transmitted by the clutch assigned to the new, next higher gear to approximately the starting value; and,
   g) essentially simultaneously increasing of the boost torque to approximately its starting value.

2. The method as described in claim 1, wherein the gear that is two gears higher is shifted between steps e) and f) between the input shaft assigned to the old gear and the output shaft.

3. The method as described in claim 2, wherein steps f) and g) begin after selection of the gear that is two gears higher.

4. The method as described in claim 1, wherein the clutch is operated in step d) in a slipping mode.

5. The method as described in claim 4, wherein the clutch in step d) and the electric machine in step e) are operated in such a manner that the sum of the drive torque produced as a result of dropping the speed of the driving engine and the boost torque of the electric machine at that time is roughly constant.

6. The method as described in claim 1, wherein, for synchronization of a transmission input speed to the transmission output speed while shifting a gear, synchronization devices are provided that are assisted by the electric machine during the synchronization process in that the electric machine applies a torque that facilitates the adjustment of the two speeds.

7. The method as described in claim 1, wherein, for synchronization of a transmission input speed with the transmission output speed while shifting a gear, the electric machine applies a torque for the adjustment of the two speeds.

* * * * *